US007261357B1

(12) United States Patent
Bechen

(10) Patent No.: US 7,261,357 B1
(45) Date of Patent: Aug. 28, 2007

(54) TAILGATE LADDER APPARATUS

(76) Inventor: Nick R. Bechen, 11726 Laura Ave., Bellevue, NE (US) 68123

( * ) Notice: Subject to any disclaimer, the term of this patent is extended or adjusted under 35 U.S.C. 154(b) by 93 days.

(21) Appl. No.: 11/281,547

(22) Filed: Nov. 17, 2005

(51) Int. Cl.
*B62D 33/03* (2006.01)
*B60R 3/02* (2006.01)

(52) U.S. Cl. ........................................ 296/62; 296/57.1

(58) Field of Classification Search ................ 296/51, 296/61, 62; 280/163, 164.1; 14/69.5, 71.1
See application file for complete search history.

(56) References Cited

U.S. PATENT DOCUMENTS

| | | | | |
|---|---|---|---|---|
| 4,639,032 A * | 1/1987 | Barbour | ........................ | 296/62 |
| 5,816,638 A * | 10/1998 | Pool, III | .................. | 296/26.11 |
| 6,042,923 A * | 3/2000 | Lewis | ........................ | 428/68 |
| 6,116,378 A * | 9/2000 | Barrow | ........................ | 182/127 |
| 6,364,392 B1 * | 4/2002 | Meinke | ........................ | 296/62 |
| 6,422,342 B1 * | 7/2002 | Armstrong et al. | ......... | 182/127 |
| 6,454,338 B1 * | 9/2002 | Glickman et al. | ......... | 296/57.1 |
| 6,834,903 B2 * | 12/2004 | Harper et al. | .................. | 296/51 |
| 6,857,680 B2 * | 2/2005 | Fielding | ........................ | 296/62 |
| 6,905,158 B1 * | 6/2005 | Bastian | ........................ | 296/62 |
| 6,913,305 B1 * | 7/2005 | Kern et al. | .................... | 296/51 |
| 6,918,624 B2 * | 7/2005 | Miller et al. | .................. | 296/62 |
| 6,942,272 B2 * | 9/2005 | Livingston | .................... | 296/62 |
| 6,971,478 B2 * | 12/2005 | Bareket | ..................... | 182/127 |
| 7,059,648 B2 * | 6/2006 | Livingston | .................... | 296/62 |
| 7,090,276 B1 * | 8/2006 | Bruford et al. | ............... | 296/62 |

* cited by examiner

Primary Examiner—D. Glenn Dayoan
Assistant Examiner—Greg Blankenship

(57) ABSTRACT

A tailgate ladder apparatus wherein an articulated step ladder is attached to a vehicle tailgate in such a way that it may be stored on a ladder housing within the interior of the tailgate. When the tailgate is open, the ladder may be slid out and opened so that a user may walk up the ladder and step onto the open tailgate.

6 Claims, 4 Drawing Sheets

TAILGATE LADDER APPARATUS

FIELD OF THE INVENTION

A tailgate ladder apparatus wherein an articulated step ladder, which is housed within the interior of a vehicle's tailgate, may be opened out to a position perpendicular to the side of the tailgate, enabling a user to easily walk up onto the vehicle's tailgate or into the cargo box.

BACKGROUND

Roughly 2.6 million pickup trucks are sold each year in the United States, and a high percentage of these are used in a work environment. By definition, a pickup truck is a light truck having an open body with low sides and a tailboard. Essentially all pickup trucks are equipped with a movable tailboard known as a tailgate, which is a hinged board or closure at the rear of a vehicle that can be lowered during loading and unloading.

Pickup truck owners use their trucks to transport and store an endless array of goods and materials of all shapes and sizes. Such items may include building materials like lumber and stone, work tools, agricultural goods, livestock, and even people.

One of the common problems faced by users of pickup trucks is that in order to get access to the pickup truck's bed, or cargo box, one must either reach over or step over the truck's sides or tailgate. While it is somewhat easy to reach over into the cargo box to grasp objects that are close to the sides, naturally it becomes increasingly difficult to reach items that are further away from the sides.

Most shortbed pickup trucks are fitted with beds whose dimensions are approximately 78 inches in length, 60 to 66 inches in width, and 15 to 17 inches in depth. The bed's width between the wheel wells, which take up space and cut into maximum cargo volume, is generally 20 inches narrower. In the case of longbed pickup trucks, beds generally range 96 inches in length, making it that much more difficult to reach objects near the bed's center while standing at the tailgate. Due to the fact that the average arm span and reach of an adult is 63 inches, it is clearly difficult for an individual standing beside the truck to reach and manipulate items located in the center of the truck bed.

Given that pickup trucks are typically used to transport goods and materials, and that user's generally have a difficult time reaching and manipulating items in the cargo box, it is not surprising that accidents and injuries are well known to occur in this environment. According to *Professional Safety* magazine, accidents that result from attempts to reach and manipulate objects in a pickup truck's cargo box are characterized as being "dramatically obvious situations in which an employee might well sustain a back related injury". In addition to the obvious potential for serious back injuries, other injuries may occur. For example, muscles may be sprained or torn due to over-extended reach or heavy lifting from an improper angle or with improper leverage. Bones may be broken when heavy items shift or are suddenly dropped. Users who risk climbing up on truck bumpers or wheel wells in order to extend their reach may slip or fall, resulting in head or other injuries.

Aside from such serious injuries, lower impact ergonomics are certainly negatively affected by the activities described above. For example, women report the frequent occurrence of muscle strain caused by reaching in over the dropped tailgate for groceries or heavy packages. Men typically sustain low-level injuries as a result of reaching to unlock or open cargo toolboxes.

PRIOR ART

Given the widespread use of pickup trucks and the high percentage of users who experience problems gaining access to objects stored in the truck's cargo box, a variety of art is found wherein various solutions to the problem are provided. Ramps have been designed to fit overtop of an opened tailgate. Sliding trays have been designed to fit in the truck bed so that the bed contents can be pulled out of the truck where they're more easily reached.

Various art is found where ladders of different sorts are designed to make cargo box access easier. For example, prior art is found wherein a single-step ladder comprised of a simple metal loop is attached to the tailgate. The step is folded down to provide a step-up onto the tailgate, and is folded closed for storage in a position parallel to the tailgate. Such designs are limited to only a single step, and the step itself is a narrow loop or bar rather than the wide step more typical of a step ladder.

Other art is found wherein a tailgate ladder is attached to the outer side of a tailgate, and is designed to be placed in an open configuration when the tailgate is closed, enabling a user to step up and over the tailgate. Unfortunately, this design requires stepping over the tailgate rather than onto it. In addition, such design alters the cosmetic appeal of the tailgate. And, given that it is stored on the outside of the tailgate when not in use, it is vulnerable to the weather and to damage.

Similar art is found wherein a tailgate ladder is attached to the inner side of a tailgate, and is designed to be placed in an open configuration when the tailgate is open. Such design is also exposed to the outdoor elements, and is vulnerable to damage from objects contained within the truck cargo box. In addition, such design may potentially hinder certain normal uses of the interior space of the cargo box.

Still other art is found wherein a single-step ladder is comprised of a simple articulated metal frame. The lower portion of the frame is folded down into an open configuration to serve as a single narrow step, and is folded up into a closed position so as to be slid into the tailgate's interior through an opening along the edge of the tailgate's outer length. Such designs are limited to only a single step, and the step itself is simply a narrow bar rather than the wide step more typical of a step ladder. In addition, this design is not preferable for use when the truck is positioned in such a way that the rear end is obstructed by a wall, loading dock, parked car, etc.

Other art is found wherein a folding ladder may be attached to either the inside or outside of a flatbed truck with a stake body. Such designs are not intended for use with a tailgate, or for use with trucks not having flat cargo bed sides.

Yet other art is found wherein ladders are designed to be completely removable from the truck. Unfortunately, such ladders must be transported and stored as separate units since they don't attache to the vehicle when not in use, and they must be manually hooked onto the sides of the truck bed in order to be used.

And still other art is found wherein ladders designed for use with a slide-in camper are comprised of a folding ladder apparatus that is attached to the tailgate and enables user to step-up into the camper shell. Unfortunately, this design is not intended for use unless a camper shell is in place.

Therefore, what is desired and has not heretofore been provided, and is herein disclosed, is a tailgate ladder apparatus that may be stored in the interior of a tailgate by sliding into the tailgate from the side edge of the tailgate.

SUMMARY

Therefore in recognition of the need for a tailgate step ladder that may be housed within the tailgate along its length, herein is disclosed an apparatus comprised of the following elements: (1) secured to the interior of a vehicle tailgate, a ladder housing made of metal or other durable material being a rectangular enclosure having a bottom and three sides, with the open fourth side positioned to be flush with the tailgate's outer side surface, the ladder housing being sized so that a ladder, inserted into the ladder housing, may be securely stored within the tailgate interior; (2) a ladder comprised of two articulated side support rails made of angle iron or other material similarly bent at a right angle along its long dimension, having (3) a plurality of steps positioned between the side support rails which are attached to both of the side rail's angled surfaces, each step being hinged so as to move between positions perpendicular to the side rails when the apparatus is in an open configuration, and positions parallel to the ladder frame when the apparatus is in a closed configuration; (4) attached to the bottommost surface of the step lowest to the ground, a rectangular brace provides support for the apparatus by evenly distributing weight on the lower portion of the ladder when in use, the brace having an opening through which one may grasp the ladder so as to move it in our out of the tailgate's interior; (5) positioned above the top hinged step, a rectangular top brace attached to and between the side rails, the brace's uppermost edge being positioned at the point where the side rails are articulated; and (6) positioned above the top brace, a stationary step attached to and between the side rails, the brace's bottommost edge being positioned at the point where the side rails are articulated and being positioned so that when the ladder is placed in a closed position, the bottommost edge of the stationary step and the topmost edge of the top brace are fit together to form a flat surface.

The invention will be seen to have several benefits and advantages. One advantage is that when in the open configuration, the tailgate ladder is situated perpendicular to the side of the tailgate, a position from which one can reach into the cargo box without having to reach across the width of the open tailgate.

Another advantage of the device is that when in the closed configuration, the tailgate ladder is housed in the interior of the tailgate, where it is protected from weather and damage.

Yet another advantage is that the ladder housing holds the ladder securely when not in use, protecting both the ladder and tailgate from damage caused by friction or other movement.

And another advantage is that, being positioned perpendicular to the side of the tailgate, use of the ladder is not constrained when the vehicle is parked close to a wall, loading dock or other parallel parked vehicle.

And another advantage is that the ladder's lowest step is relatively close to the ground, making it easy step up onto the ladder.

Still another advantage is that the ladder enables one to walk up onto the tailgate or into the truck bed without having to slide, crawl, or stand on another high object.

And yet another advantage is that, being housed in the interior of the tailgate along its length, the ladder may be of a greater length than a ladder that is sized so as to be stored in the width of the tailgate.

And an eighth advantage is that the ladder's top brace serves as a standing platform, or a bed to rest items upon.

And still another advantage is that the ladder's bottom brace provides stability when the ladder is in use.

Another advantage is that when in the closed configuration, the bottommost surface of the ladder is flush with the side of the tailgate and therefore does not interfere with the normal functioning or aesthetics of the tailgate.

Still another advantage is that very little effort is required to place the ladder apparatus in the open or closed configuration.

And another advantage is that due to the ladder being housed within the tailgate's interior when not in use, there is no risk of the apparatus accidentally unfolding while the vehicle is in motion, or under other circumstances when the ladder is not in use.

And yet another advantage is that the apparatus may be easily grasped and manipulated by slipping a finger through the hole positioned in the ladder's bottommost brace.

These benefits and advantages will become apparent in the description and drawings that follow.

DETAILED DESCRIPTION

Figure 1:
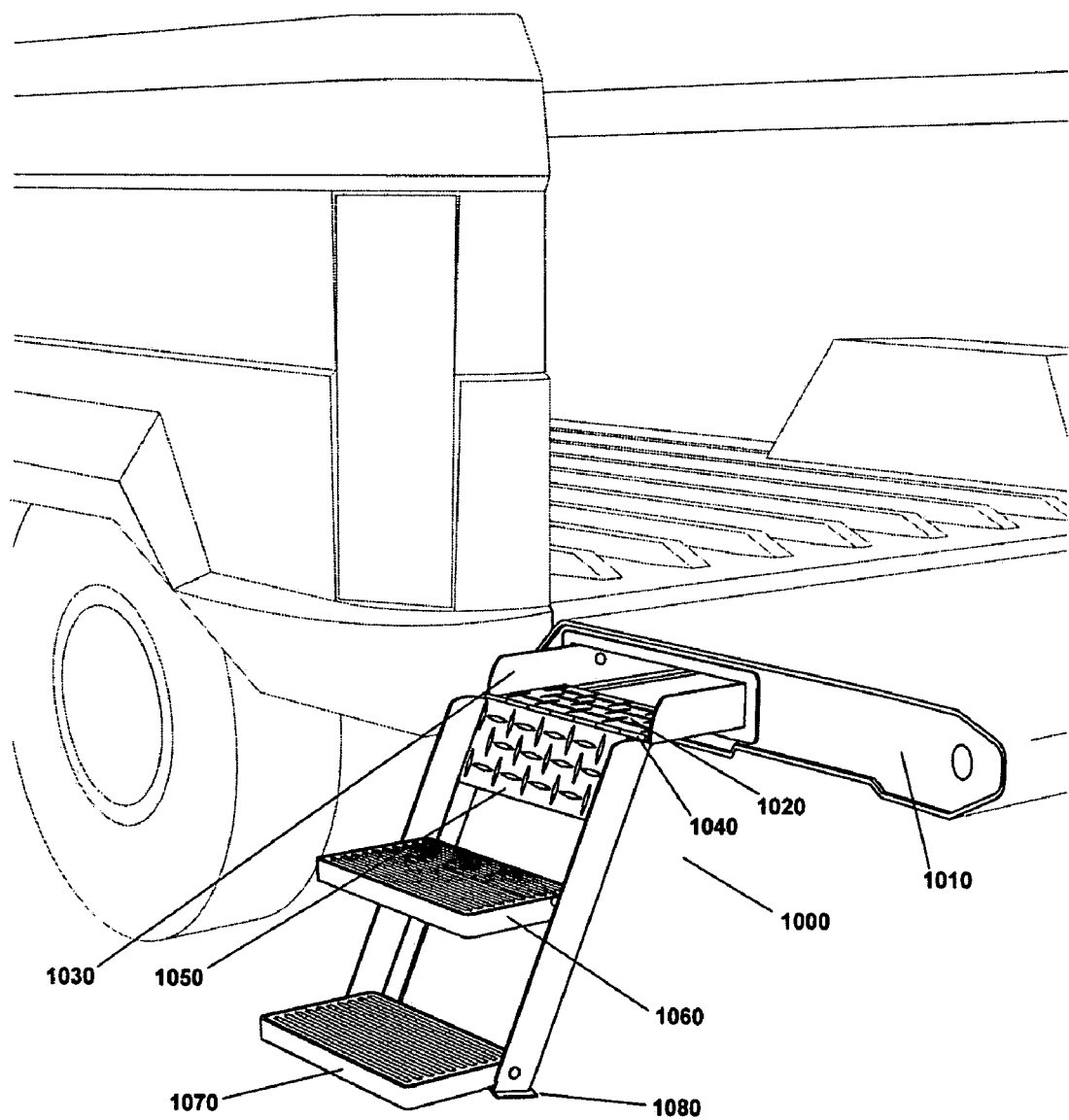
FIG. 1 shows a side view of a tailgate ladder apparatus in an open configuration with the ladder fully extended from the tailgate, with steps open.

With reference to FIG. 1, a tailgate ladder apparatus in an open configuration 1000 being extended out from a vehicle tailgate 1010, the ladder having a stationary step 1020 attached to and between the angled surfaces of the side rails 1030, the ladder being articulated 1040 at a point between the stationary step 1020 and a top brace 1050 which is attached to and between the side rails 1030, the top brace 1050 being positioned above the top hinged step 1060. Beneath the ladder's bottom hinged step 1070, attached to the bottommost surface of the step 1070, a rectangular brace 1080 supports the apparatus where it comes into contact with the ground or pavement.

Figure 2:
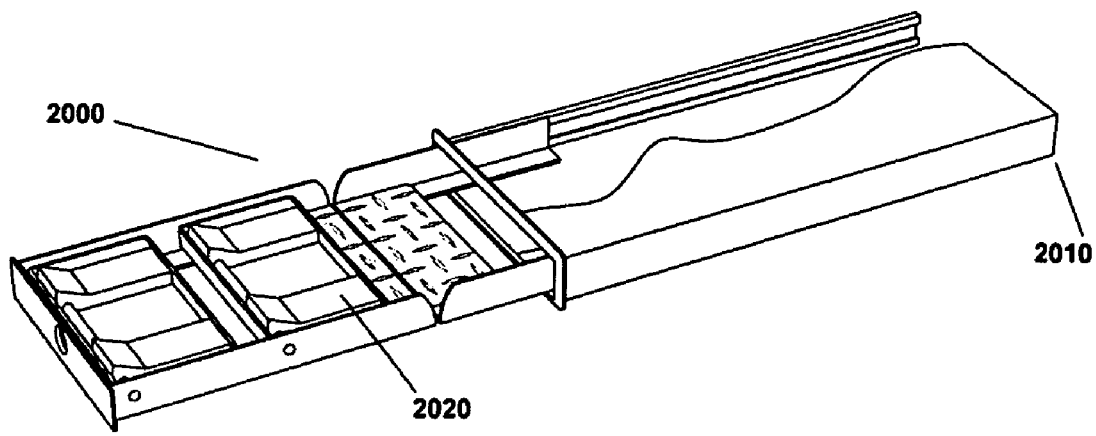
FIG. 2 shows a front view of a ladder apparatus in an open configuration wherein the ladder's is positioned perpendicular to the tailgate, with steps in the closed configuration.

With reference to FIG. 2, a tailgate ladder apparatus in an open configuration 2000, being extended out from the interior of the tailgate 2010 in a position perpendicular to the tailgate, with hinged ladder steps 2020 in the closed configuration.

Figure 3:
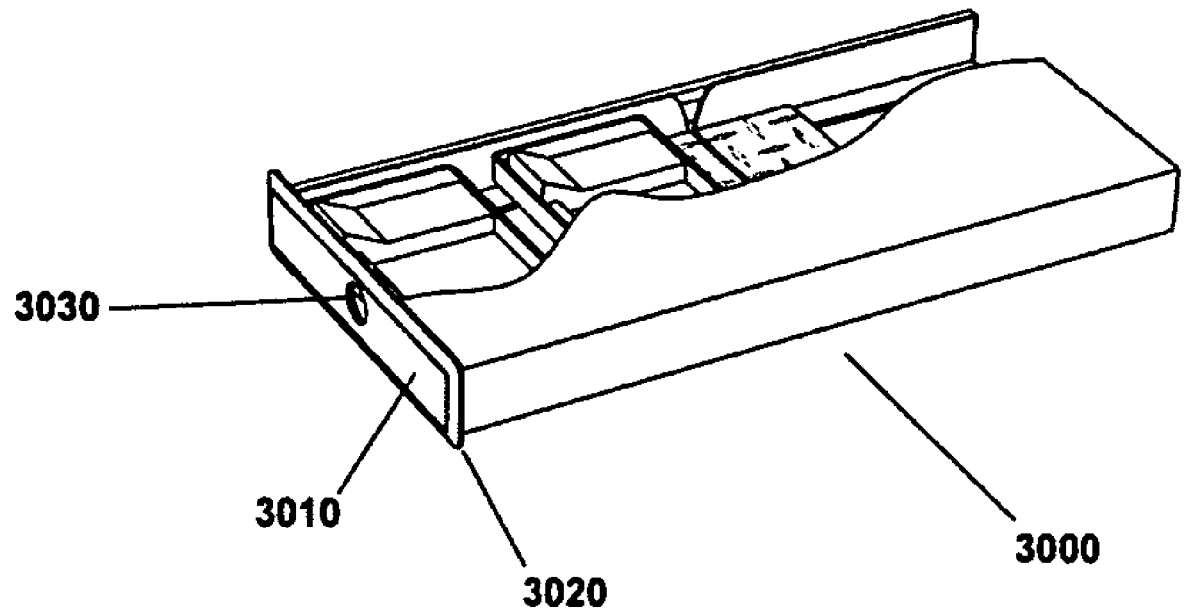
FIG. 3 shows a front view of a ladder apparatus in the closed configuration wherein the ladder's bottommost brace is flush with the side of an open tailgate.

With reference to FIG. 3, a tailgate ladder apparatus in the closed configuration 3000 wherein the ladder's bottommost brace 3010 is flush with the side of an open tailgate 3020, and has an opening 3030 through which one may grasp the ladder.

Figure 4:
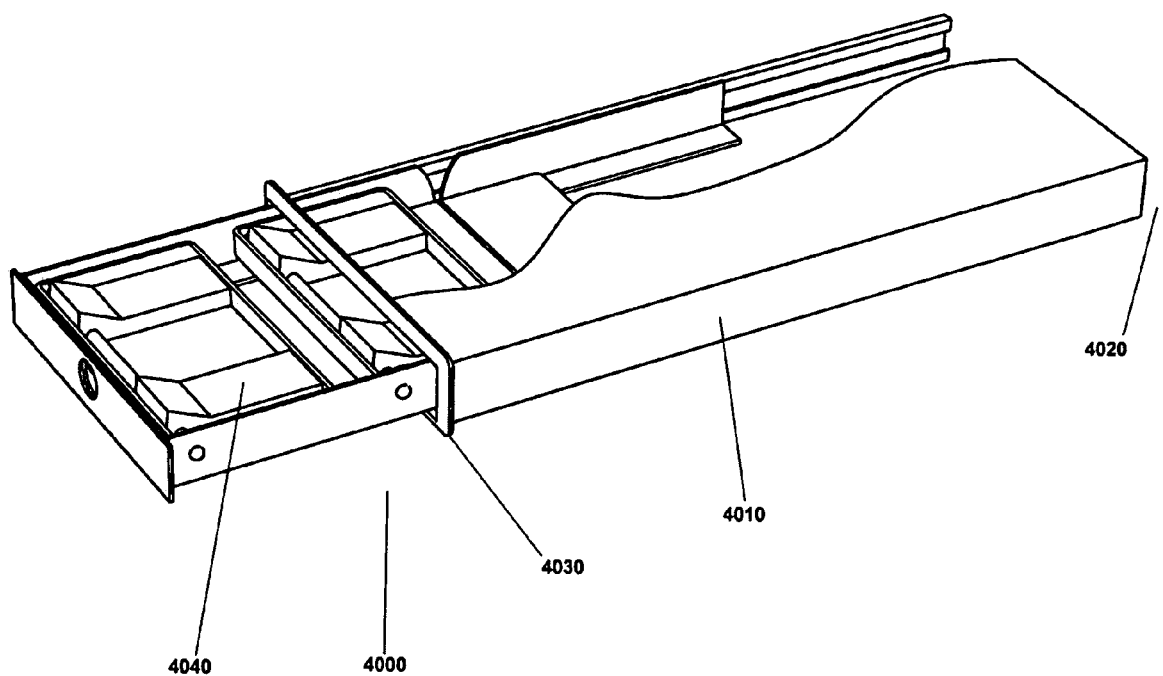
FIG. 4 shows a top-down cutaway view of a tailgate ladder apparatus in the closed configuration, in which the ladder is seated in the ladder housing within the interior of a vehicle tailgate.

With reference to FIG. 4, a tailgate ladder assembly 4000 seated in the ladder housing 4010 within the interior of a vehicle tailgate 4020, the ladder housing 4010 being a rectangular enclosure having a bottom and three sides, with the open fourth side positioned to be flush with the tailgate's outer side surface 4030, the ladder housing being sized so that a ladder 4000, inserted into the ladder housing 4010, may be securely stored within the tailgate interior 4020.

What is claimed is:

1. A tailgate ladder apparatus having an articulated step ladder that is housed within the interior length of a vehicle's tailgate and may be opened out to a position perpendicular to the side of the tailgate, being comprised of:
   a ladder housing secured to the interior of a tailgate;
   a ladder comprised of two articulated side support rails bent at right angles along the length;
   a plurality of hinged ladder steps positioned between the side support rails which are attached to the angled surfaces of the side rails;
   a rectangular brace attached to the bottommost surface of the step closest to the ground;
   an opening in the brace through which one may grasp the ladder;
   a rectangular top brace above the top hinged step that is attached to and between the articulated side rails; and,
   a stationery step above the top brace that is attached to and between the articulated side rails.

2. The device of claim 1, wherein the ladder housing is a rectangular enclosure having a bottom and three sides, with the open fourth side positioned to be flush with the tailgate's outer side surface.

3. The device of claim 1, wherein the ladder housing is sized so that a ladder inserted into the housing may be securely stored within the tailgate interior.

4. The device of claim 1, wherein the hinged steps move between positions perpendicular to the side rails when the apparatus is in an open configuration, and positions parallel to the side support rails when the apparatus is in a closed configuration.

5. The device of claim 1, wherein the rectangular brace provides support for the apparatus by evenly distributing weight on the lower portion of the ladder when in use.

6. The device of claim 1, wherein the brace's bottommost edge is positioned so that when the ladder is placed in a closed position, the bottommost edge of the stationary step and the topmost edge of the top brace fit together to form a flat surface.

* * * * *